United States Patent
Kojima et al.

(10) Patent No.: US 9,052,461 B2
(45) Date of Patent: Jun. 9, 2015

(54) COMPOUND OPTICAL COMBINER

(71) Applicants: Mitsubishi Electric Research Laboratories, Inc., Cambridge, MA (US); Mitsubishi Electric Corporation, Chiyoda-ku, Tokyo (JP)

(72) Inventors: Keisuke Kojima, Weston, MA (US); Bingnan Wang, Quincy, MA (US); Toshiaki Koike-Akino, Salem, MA (US); Satoshi Nishikawa, Tokyo (JP); Eiji Yagyu, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 172 days.

(21) Appl. No.: 13/868,849

(22) Filed: Apr. 23, 2013

(65) Prior Publication Data
US 2014/0314367 A1    Oct. 23, 2014

(51) Int. Cl.
*G02B 6/00* (2006.01)
*G02B 6/27* (2006.01)

(52) U.S. Cl.
CPC .................................. *G02B 6/2773* (2013.01)

(58) Field of Classification Search
USPC ........................................................... 385/11
See application file for complete search history.

(56) References Cited

U.S. PATENT DOCUMENTS

| 5,377,287 | A | 12/1994 | Lee et al. |
| 6,195,482 | B1 | 2/2001 | Dragone |
| 6,252,719 | B1 | 6/2001 | Eichenbaum et al. |
| 6,400,860 | B1 | 6/2002 | Chandrasekhar et al. |
| 7,403,677 | B1 * | 7/2008 | Zhao et al. ........... 385/15 |
| 2001/0048782 | A1 * | 12/2001 | Teng et al. ........... 385/11 |
| 2008/0075410 | A1 * | 3/2008 | Spillane et al. ........... 385/122 |
| 2010/0142879 | A1 * | 6/2010 | Doi et al. ........... 385/2 |

OTHER PUBLICATIONS

L. Soldano, F. Veerman, M. Smit, B. Verbeck, A. Dubost, E. Pennings. Planar Monomode Optical Couplers Based on Multimode Interference Effects, Journal of Lightwave Technology, vol. 10, No. 12, Dec. 1992. 0733-8724/92.
Kurokawa et al., "100Gbit/s small-sized transmitter module with optical multiplexer," IEICE (Institute of Electrical, Information, and Communication Engineers in Japan) General Conference 2013, paper C-3-22.

* cited by examiner

*Primary Examiner* — Jerry Blevins
(74) *Attorney, Agent, or Firm* — Dirk Brinkman; Gene Vinokur

(57) ABSTRACT

A compound optical combiner for combining multiple optical signals includes a set of combiners. The set of combiners includes at least one polarization combiner optically connected to at least one non-polarization combiner. The non-polarization combiner combines a first set of input signals while preserving a polarization of each input signal in the first set of signals. The polarization combiner combines a second set of input signals while converting the polarization of at least one input signal in the second set of signals.

15 Claims, 13 Drawing Sheets

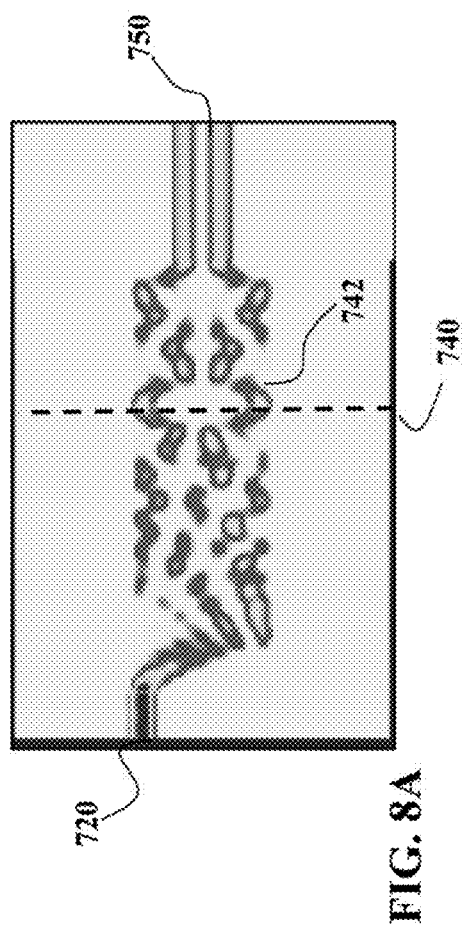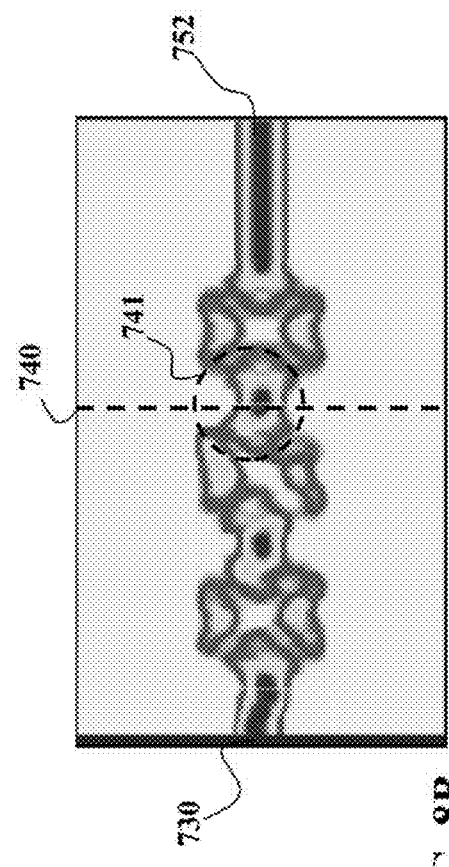

COMPOUND OPTICAL COMBINER

FIELD OF THE INVENTION

This invention relates generally to optical combiners, and more particularly to compound optical combiners for combining multiple optical signals.

BACKGROUND OF THE INVENTION in optical communication systems, such as 40 G bits per second (b/s) or 100 G b/s Ethernet for distances less than 40 km, data rates and bandwidth are required to be very high, and the size and cost of transceivers are expected to be very low. To reduce the cost, in many cases, multiple optical signals of different wavelengths are combined into a single optical fiber. By combining several signals, the capacity of optical communications is increased.

There are two types of optical combiners, i.e., power combiners and wavelength combiners. Multimode interference (MMI) based couplers are commonly used as power combiners for combining multiple optical signals of different wavelengths. At the input side of the MMI coupler, a number of waveguide ports are used to guide multiple input signals. At the output, a single port is used for an output signal, and all input signals are combined into this output signal. However, for each input signal, only a fraction of power is present in the output signal.

For example, a 4×1 MMI coupler can combine four optical signals, but with a power loss of at least 6 decibels (dB) for each signal. Examples of such devices are described by Besse et al. "Optical bandwidth and fabrication tolerance of multimode interference couplers," IEEE J. Lightwave Technol., vol. 12, no. 6, pp. 1004-1009, June 1994.

Examples of wavelength combiners include arrayed-waveguide gratings, and ring-resonator based filters. Wavelength combiners are typically narrow hand, which can cause signal distortion. The wavelength combiners theoretically provide small power loss, but in practice the loss is much larger. The precise control of dimensions of the wavelength combiners is difficult and small error in the dimensions of the combiner can lead to a large insertion loss. The insertion loss is the loss of signal power resulting from the insertion of the combiner in the optical fiber, and is usually dB. Examples of such devices are described in U.S. Pat. No. 6,195,482.

Accordingly, there is a need for an optical combiner that minimizes the insertion loss of the power of the input signals.

SUMMARY OF THE INVENTION

It is an object of some embodiments of the invention to a system for combining optical signals white minimizing insertion loss. It is a further object of some embodiments of the invention to provide an optical combiner that has a large bandwidth and is simple to fabricate.

Some embodiments of the invention take advantage of the two general characteristics of optical data communications. First, input signals of each wavelength have the same mode of polarization, e.g., a transverse electric (TE) mode. Second, in the output signal resulting from combination of the input signals, relative polarization between each wavelength forming the output signal does not have to be the same.

Some embodiments of the invention are based on a realization that a polarization combiner can combine optical signals of specific polarizations with minimal loss of the power of the combined optical signals. Moreover, the non-polarization combiner can combine the optical signals into signals suitable for the polarization combiner. Thus, the compound optical combiner that includes at least one polarization combiner and at least one non-polarization combiner can combine multiple, e.g., four, optical signals, while optimizing the power of the combined signal.

Such realizations and recognitions enable the design of a compound optical combiner using polarization combiner. Advantageously, polarization combiner eliminates inherent loss when compared with power only combiners. In addition, polarization combiners reduce the requirement of wavelength characteristics and double wavelength separation when compared with the wavelength combiners.

Accordingly, one embodiment discloses a compound optical combiner for combining multiple optical signals includes a set of combiners. The set of combiners includes at least one polarization combiner optically and physically connected to at least one non-polarization combiner. The non-polarization combiner combines a first set of input signals while preserving a polarization of each input signal in the first set of signals. The polarization combiner combines a second set of input signals while converting the polarization of at least one input signal in the second set of signals.

BRIEF DESCRIPTION OF HE DRAWINGS

FIGS. 8A and 8B are illustration of simulations of the propagation of the signals in a spatial mode converter of FIG. 7.

DETAILED DESCRIPTION OF THE PREFERRED EMBODIMENT

Some embodiments of die invention provide an optical combiner for multiple optical signals that minimizes insertion loss, and maximizes bandwidth. Some embodiments take advantage from the fact that, polarization multiplexing is typically not used when communicating data optically. In other words, each optical signal has a single polarization. Similarly, optical sources, e.g., lasers oscillate with the same polarization, e.g., in transverse electric (IF) modes. In addition, optical signals in a single mode fiber can be of any polarization. There is no requirement for relative polarizations among optical signals.

Such realizations and recognitions enable the design of a compound optical combiner using both polarization and non-polarization combiners. Advantageously, polarization combiner eliminates inherent loss when compared with power only combiners. In addition, polarization combiners reduce the requirement of wavelength characteristics and double wavelength separation as compared to the wavelength combiners.

Figure 1A:
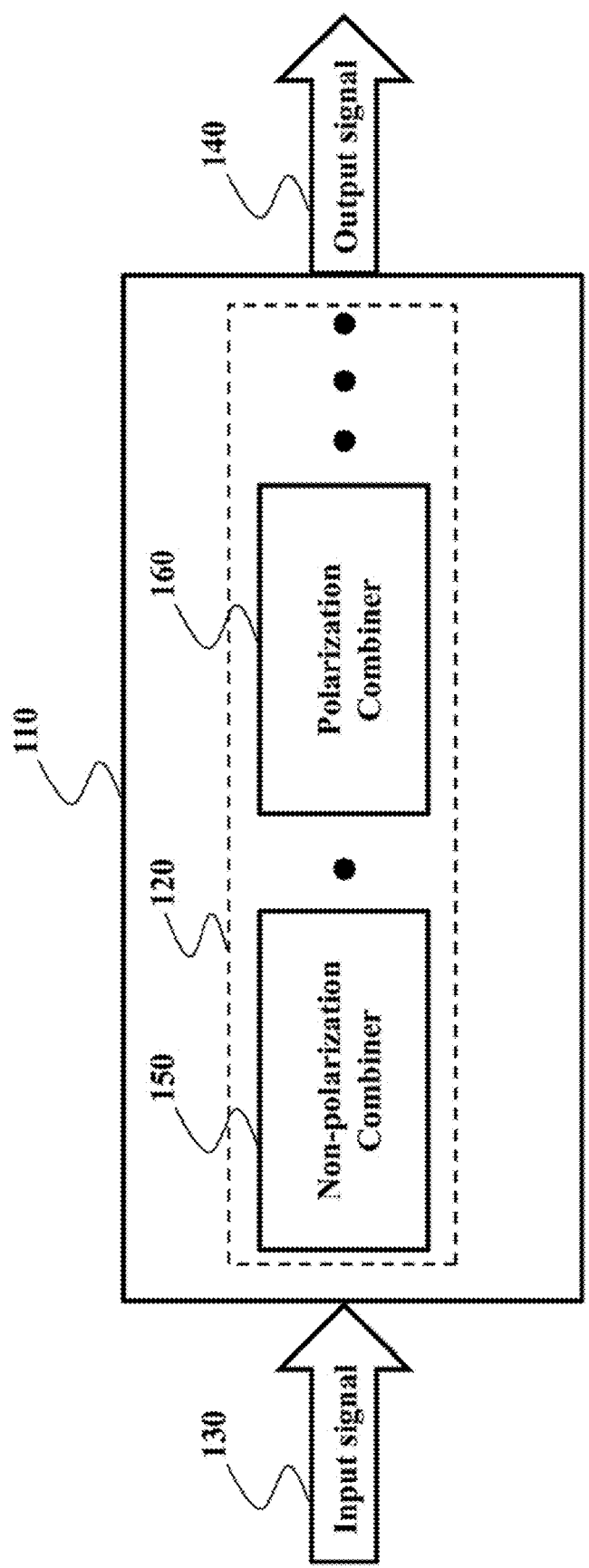
FIG. 1A is a schematic of a compound optical combiner according to sonic embodiments of the invention.

FIG. 1A shows a compound optical combiner 110 according to some embodiments of the invention. The compound optical combiner can be used for combining optical signals, while minimizing power loss of the optical signals.

For the compound optical combiner 110, an input signal 130 includes multiple optical signals, and the output signal 140 includes a single optical signal with multiple optical components of different polarities. The polarities of the input and/or output signals can include a fundamental transverse magnetic (TM) mode, and a fundamental transverse electric (TE) mode.

The combiner 110 is formed by a set 120 of optical combiners including at least one polarization combiner 160, and at least one non-polarization combiner 150. In some embodiments, the combiner 110 is integrated optical device and the combiners 150 and 160 are optically and physically connected to each other. As used herein, the non-polarization combiner combines multiple input signals, e.g., a first set of input signals, while preserving polarization of each input signal in the first set. The polarization combiner combines multiple input, signals, e.g., a second set of input signals, while converting a polarization of at least one input signal in the second set.

An example of non-polarization combiners includes power and wavelength combiners. An exemplar polarization combiner can include a spatial mode converter and/or a polarization converter.

Some embodiments of the invention are based on as realization that a polarization combiner can combine optical signals of specific polarization with minimal loss of the power of the combined optical signals. Thus, the compound optical combiner that includes at least one polarization combiner and at least one non-polarization combiner can combine multiple, e.g., four, optical signals while optimizing the power of the combined signal.

Figure 1B:
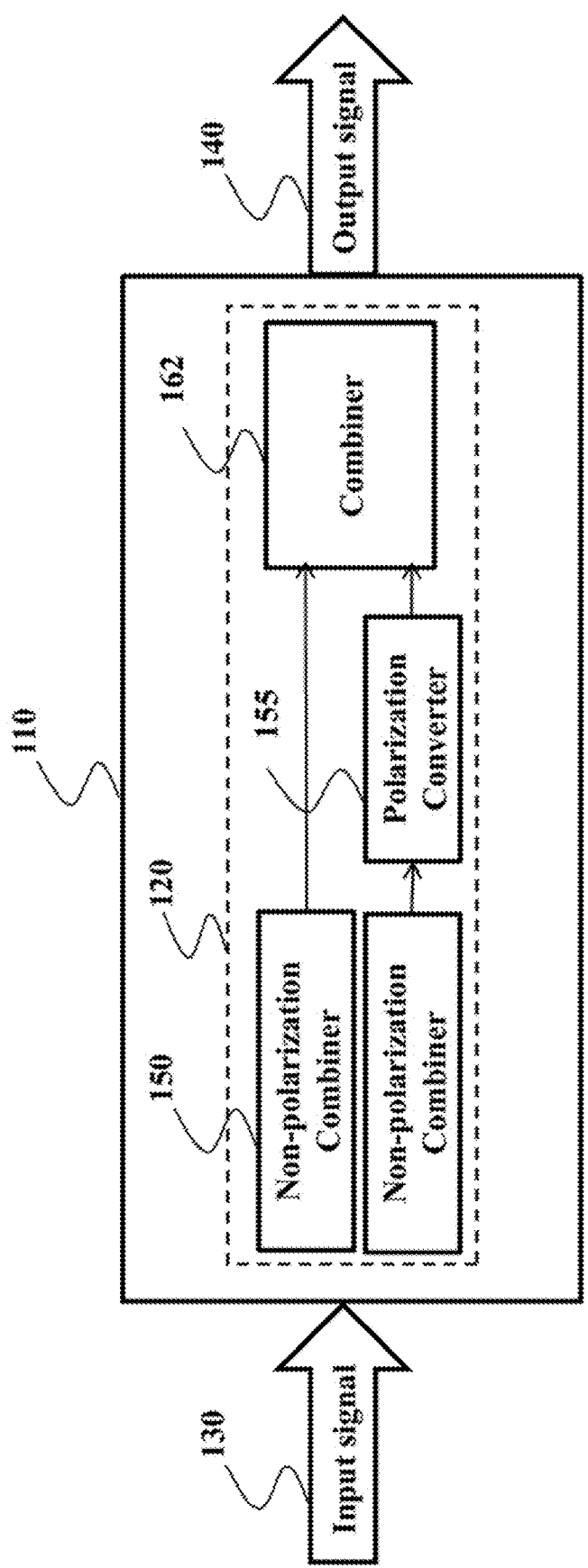
FIGS. 1B and 1C are schematics of a variation of the compound optical combiner of FIG. 1A according to some embodiments of the invention.

FIG. 1B shows a variation of the compound optical combiner 110 according to some embodiments of the invention. In this embodiment, the polarization converter 160 is implemented as a polarization converter 155 optically connected to a combiner 162. In this embodiment, the polarization converter 155 convert the polarization of at least one optical signal, and the combiner 162 combines multiple optical signals of different polarity outputted by the polarization converter 155 and non-polarization combiner 150.

Figure 1C:
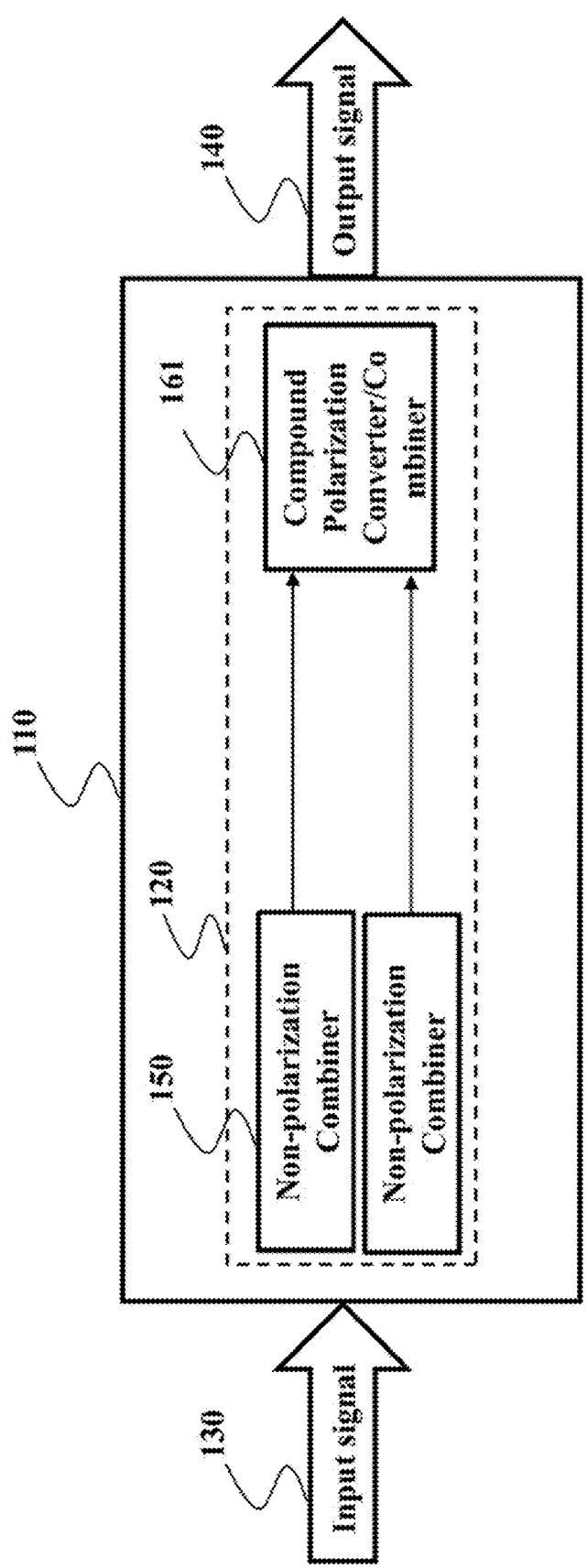

FIG. 1C shows another variation of a compound optical combiner 110, wherein a polarization combiner 161 is compound and has a combined functionality of a polarization converter and a combiner. In variations of the embodiments of FIGS. 1B and 1C, the set of combiners includes two non-polarization combiners connected to the polarization combiner, such that output signals of the two non-polarization combiners are input signals for the polarization combiner.

Figure 2A:
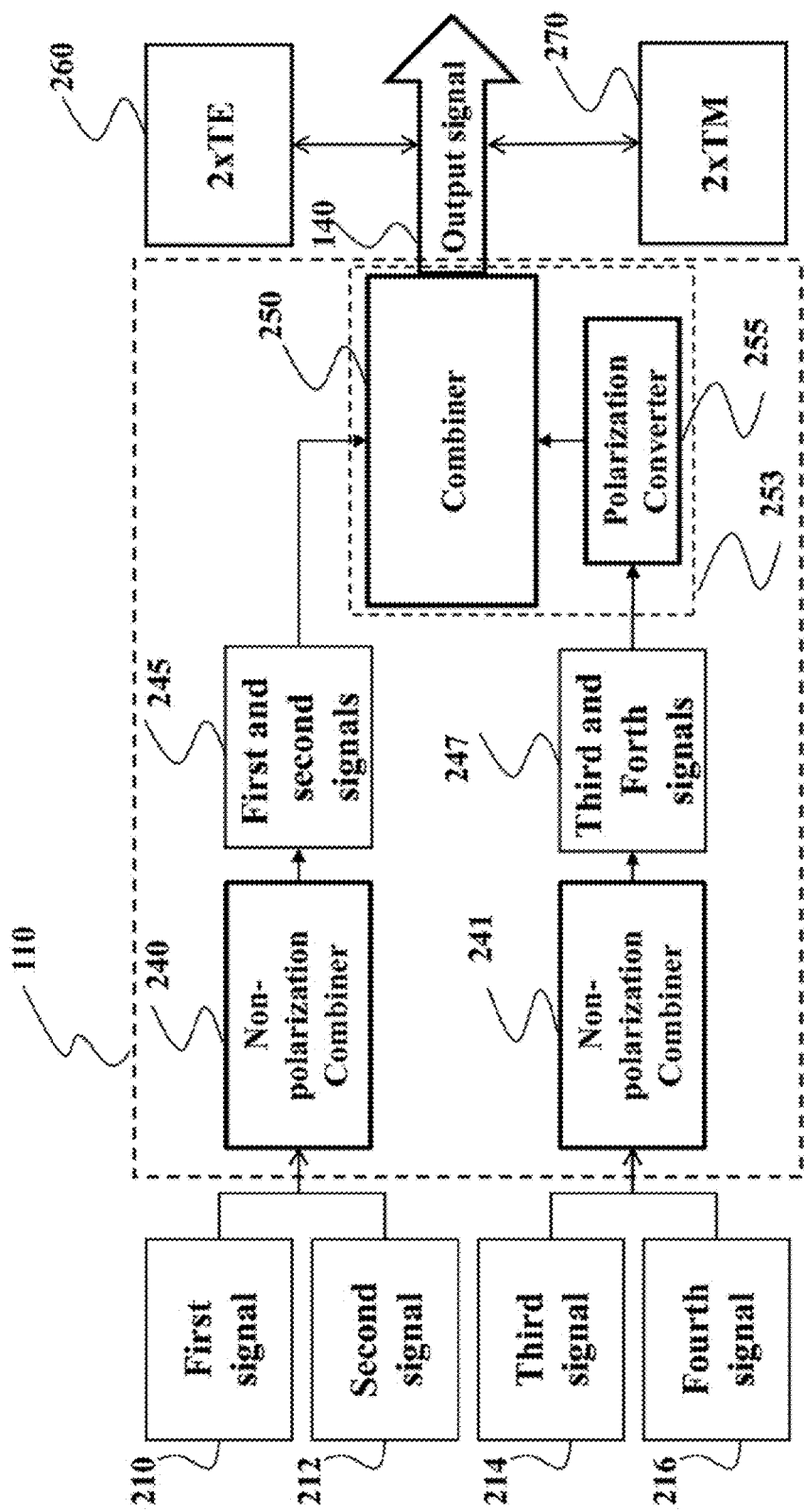
FIG. 2A is a block diagram of a method for combining four input optical signals according to some embodiments of the invention.

FIG. 2A shows a block diagram of combining four input optical signals, including a first signal 210, a second signal 212, a third signal 214 and a fourth signal 216, using the compound converter 110 according to one embodiment of the invention. The optical signals are the input to the compound converter 110, which includes a two non-polarization combiners, i.e., a first non-polarization combiner 240 and a second non-polarization combiner 241 The compound converter also includes a polarization converter 255 and a combiner 250. Additionally or alternatively, the polarization converter 255 and the combiner 250 can be implemented as a compound polarization combiner 253.

The non-polarization combiners 240-241 combine multiple optical signals, while preserving polarization of components of the optical signals to output multiple combined optical signals. Specifically, the first non-polarization combiner 240 combines the first and the second signal forming a first combined signal 245 and the second non-polarization combiner 241 combines the third and fourth signal forming a second combined signal 247. The polarization converter 255 converts the polarization of the second combined signal 247. The polarization combiner 250 combines the first and the second combined signals into a single optical signal 140. The optical signal 140 can include a first component 270 in a fundamental transverse magnetic (TM) mode and a second component 260 in a fundamental transverse electric (TE) mode.

Figure 2B:
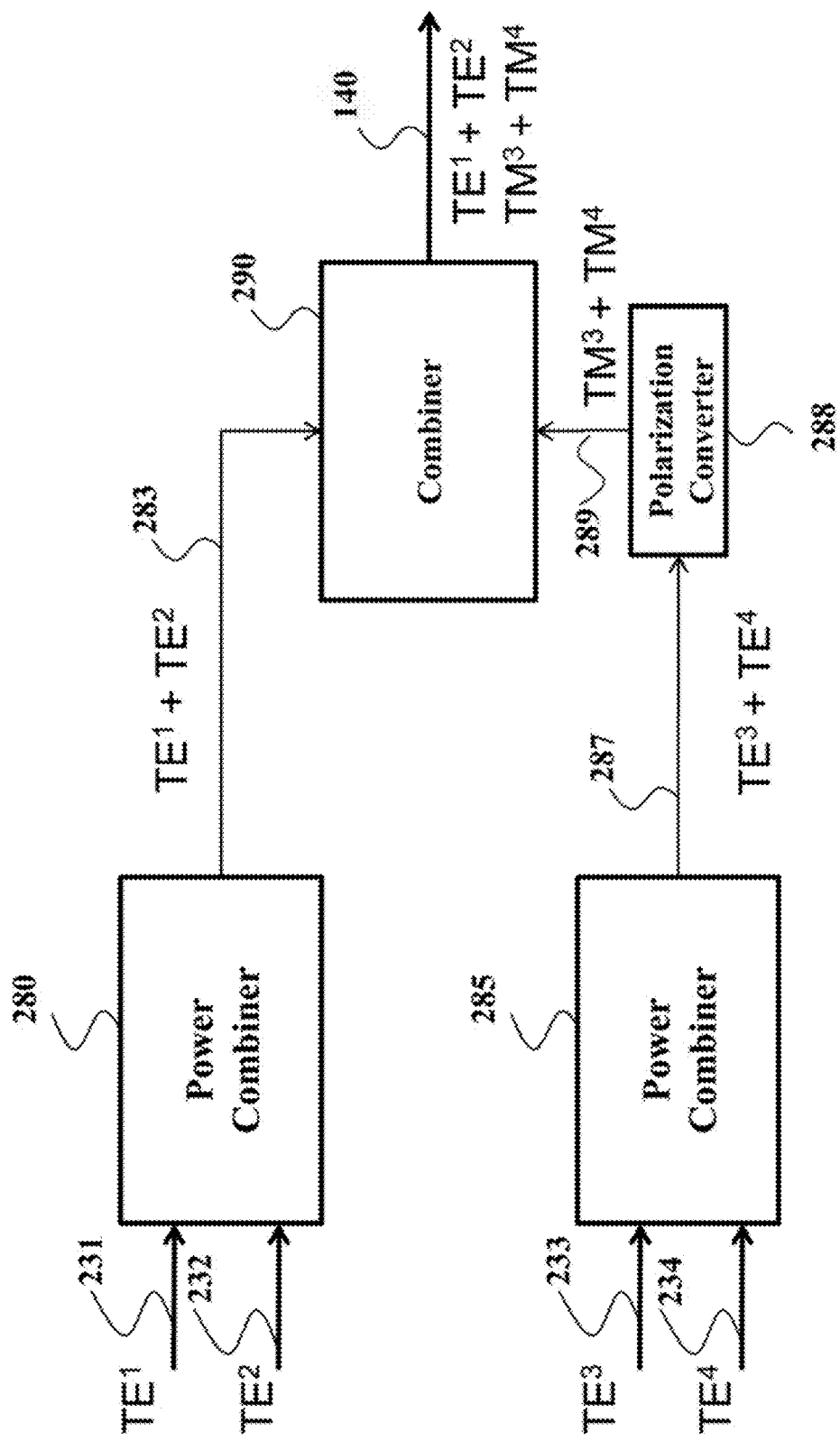
FIGS. 2B and 2C are variations of the method of according to some embodiments.

FIG. 2B shows a variation of the compound optical combiner of FIG. 2A according, to one embodiment. The four input signals are input signals in the TE mode, i.e., the signals TE1 231, TE2 232, TE3 233, and TE4 234. The non-polarization combiner is formed by two power combiners 280 and 285. The power combiner 280 combines signals 231 and 232 for form a signal 283 that include two components in the TE mode. Similarly, the power combiner 285 combines signals 233 and 234 for form a signal 287 that also include two components in the TE mode. The polarization converter 288 converts the polarization of a combined the TE signal 287, e.g., two components in the TE mode, into a TM signal 289, e.g., two components in the TM mode. The polarization combiner 290 combines the signals such that the polarization of the signal 283 is preserved to form the TE mode component of the output signal 140, e.g., two components in the TE mode. The polarization of the TM signal 289 is unchanged forming the TM mode component of the output signal 140, e.g., two components in the TM mode. Other variations of the combiners are possible.

Figure 2C:
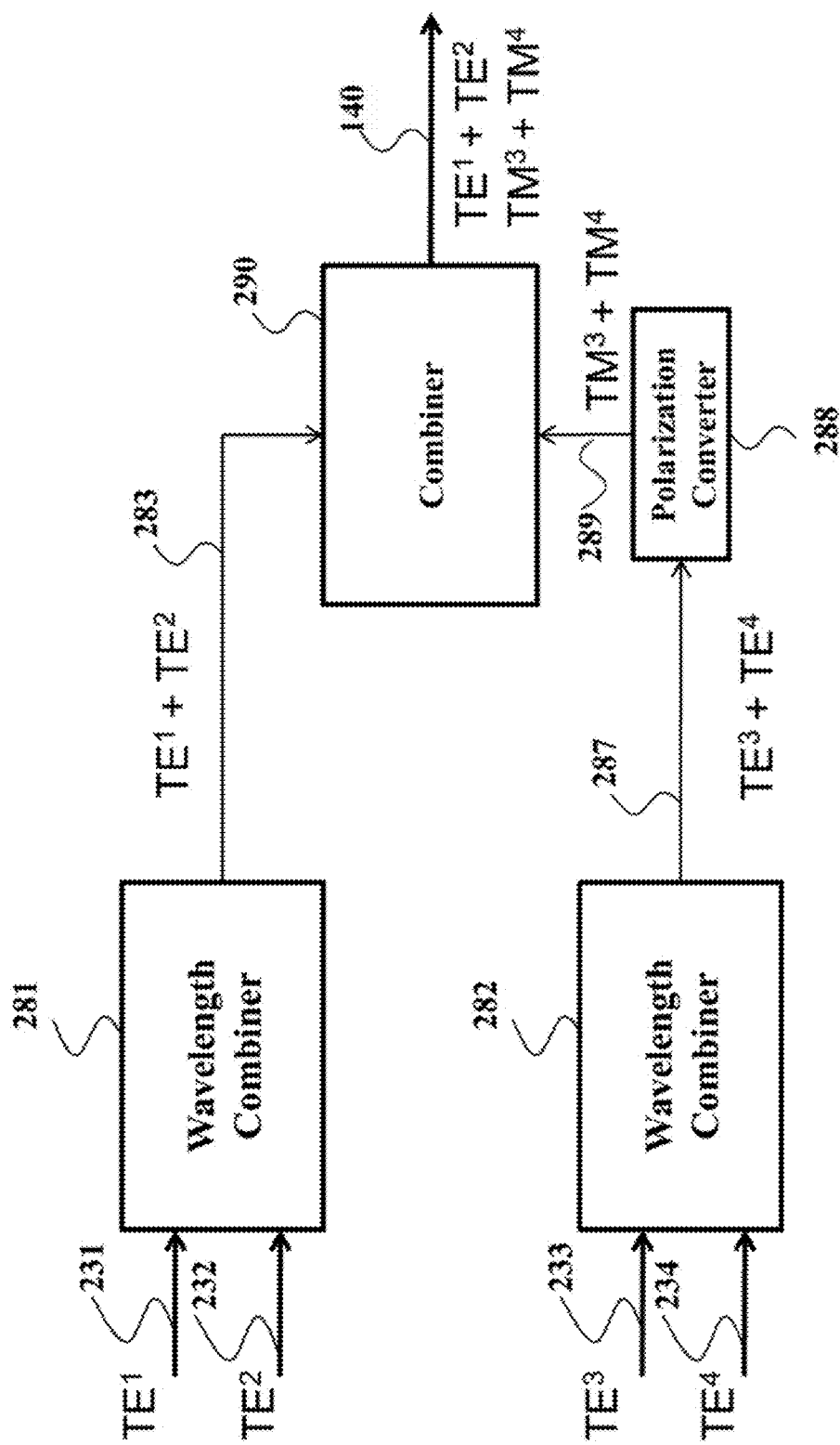

FIG. 2C shows a variation of the compound optical combiner of FIG. 2A according to another embodiment. The four input signals are input signals in the TE mode, i.e., the signals TE1 231, TE2 232, TE3 233, and TE4 234. Here, the first input signal is in the TE mode with a first wavelength $\lambda_1$, the second input signal is in the TE mode with a second wavelength $\lambda_2$, the third input signal is in the TE mode with a third wavelength $\lambda_3$, the fourth input signal is in the TE mode with a fourth wavelength $\lambda_4$, such that $\lambda_1 > \lambda_3 > \lambda_2 > \lambda_4$. The non-polarization combiner is formed by two wavelength combiners 281 and 282.

The wavelength combiner 281 combines signals 231 and 232 for form a signal 283 that include two TE mode components. Similarly, the wavelength combiner 285 combines signals 233 and 234 for form a signal 287 that also include two TE mode components. Because the wavelength spacing between $\lambda 1$ and $\lambda 2$ is typically twice larger than that between $\lambda 1$ and $\lambda 3$, the requirements for the wavelength combiner 281 is reduced, yielding to smaller size and/or larger manufacturing tolerance. The polarization converter 288 converts the polarization of a combined TE signal 287 into a TM signal 289. The polarization combiner 290 combines the signals such that the polarization of the signal 283 remains unchanged and for the TE mode component of the output signal 140. The polarization of the TM signal 287 is unchanged to form TM mode component of the output signal 140. Other variations of the combiners are possible.

The compound combiner can be implemented as an epitaxial-grown structure having a substrate, a core and cladding layers. For example, in one embodiment, the compound converter is an indium phosphide (InP)/indium gallium arsenide phosphide (InGaAsP) structure, which includes an InP substrate, an InGaAsP core layer with As composition of e.g., 60% lattice matched to InP, and InP cladding layer. In another embodiment, the compound converter is a gallium arsenide (GaAs)/aluminum gallium arsenide (AlGaAs). Other variations are possible and within the scope of the embodiments of the invention.

The Compound Polarization Converter/Combiner

Some embodiments of the invention use a polarization combiner, e.g., a converter/combiner 161, which has the combined functionality of the polarization converter and combiner. In some embodiments, the polarization combiner is implemented using a spatial mode converter followed by a polarization converter.

The spatial mode converters convert at least an order of the modes of the component of the optical signal. For example, the spatial mode converter can convert a first order mode of an optical signal into a second order mode. The spatial mode converter can include, but is not limited to, an asymmetric V-shaped coupler, and asymmetric directional coupler, and a multimode interference (MMI) based spatial mode converter.

In some embodiments, the spatial mode converter maintains the first signal in a fundamental TE mode, while converts the second signal in the first order TE mode into the second order TE mode and combines the two signals into the same output port. In those embodiments, the spatial mode converter is also a combiner.

In some embodiments, the polarization converter is a type of polarization converter, in which a second order TE mode is converted to a first order TM mode, while a first order TE mode maintains the mode.

Figure 3:
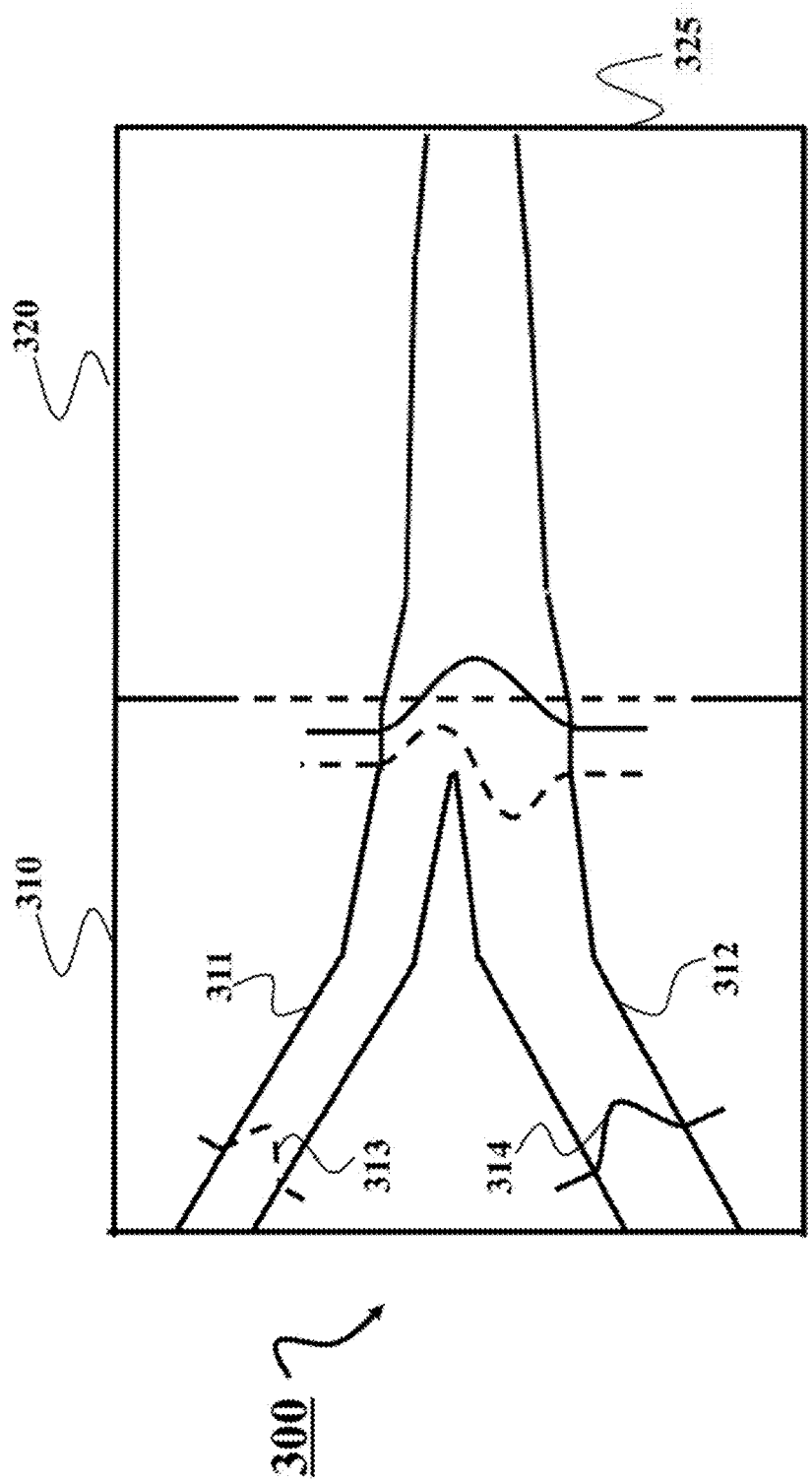
FIG. 3 is an example of the polarization combiner according to one embodiment.

FIG. 3 shows an example of the polarization combiner 300. In this embodiment, both the first optical signal 313 propagating through an upper Y-branch 311 and the second optical signal 314 propagating through a lower Y-branch 312 are in fundamental $TE_0$ mode. A spatial mode converter 310, e.g., a Y-coupler, converts $TE_0$ mode of the first signal into $TE_1$ mode without changing the second signal. A polarization converter 320 converts the $TE_1$ mode of the first signal into the $TM_0$ mode without changing the second signal. Accordingly, at the output of the combiner 300, the fundamental TE mode of the first signal is converted to fundamental TM mode, and the polarization of fundamental TE mode of the second component is maintained. Furthermore, the fundamental modes TE and TM are combined and propagate concurrently.

In the combiner 300, the second order mode $TE_1$ may not be fully converted to a $TM_0$ mode at the output port of the device at line 325. To further increase the conversion efficiency other converters, e.g., a bi-level taper can be introduced.

Figure 4:
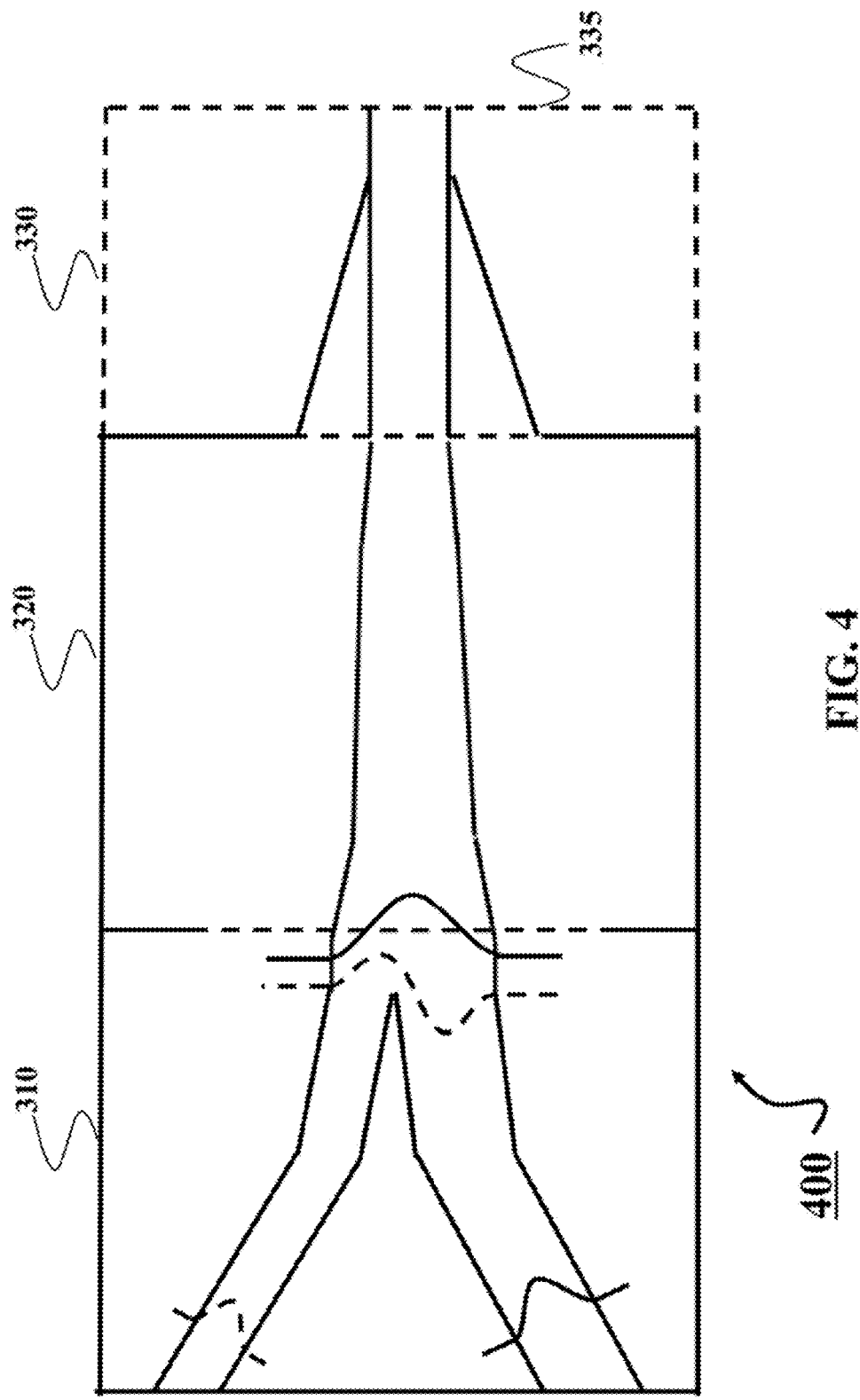
FIG. 4 is an example of the polarization combiner according to one embodiment.

FIG. 4 shows another example of the compound polarization combiner including the bi-level taper 330. In this embodiment, both the first signal at the upper Y-branch and the second signal as the lower Y-branch have fundamental TE mode. A spatial mode converter 310, e.g., a Y-coupler, converts the $TE_0$ mode of the first signal into the $TE_1$ mode without changing the second signal. A polarization converter 320 converts the $TE_1$ mode of the first signal into the $TM_0$ mode without changing the second signal.

In this embodiment, the polarization converter is a combination of two parts, i.e., a width taper 320, and a bi-level taper 330. At the output of the device 400, the fundamental TE mode of the first signal is converted to fundamental TM mode and the polarization of fundamental TE mode of the second signal is maintained. The fundamental modes TE and TM are combined, and propagate together.

In the embodiment shown in FIG. 4, the second order mode $TE_1$ component can still be present at the output port of the device at line 335. For example, if the second order $TE_1$ mode of the signal is propagated together with both $TE_0$ and $TM_0$ modes that can lead to low extinction ratio and unsatisfactory performance of polarization combiner. To improve the performance, higher order modes need to be removed before the signal is outputted. To that end, some embodiments of the invention include, a high-order mode filter to remove modes, and only two fundamental $TE_0$ and $TM_0$ modes are passed.

Figure 5:
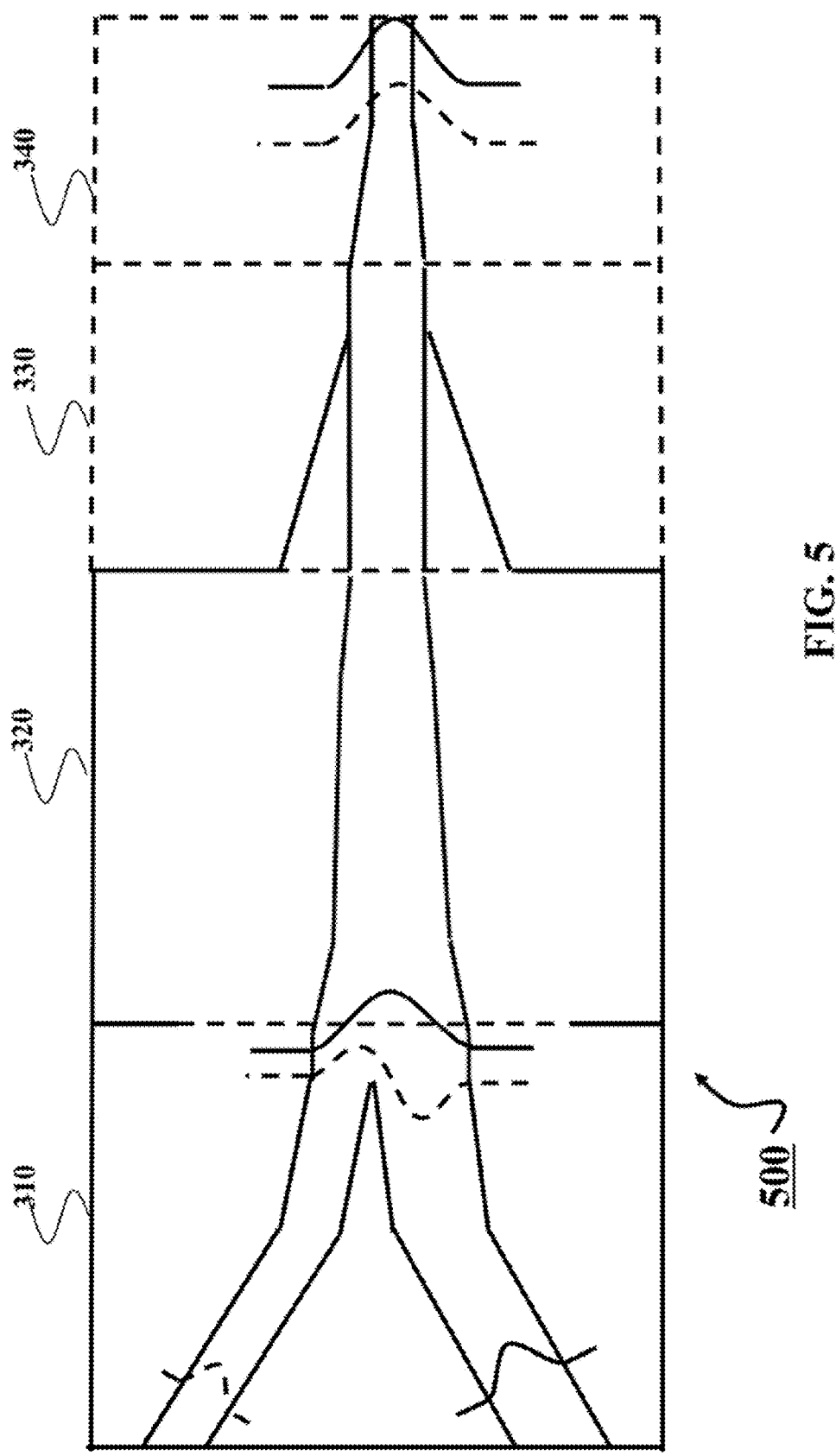
FIG. 5 is an example of the polarization combiner according to one embodiment.

FIG. 5 shows another example of the compound polarization combiner 500. In this embodiment, both the first signal at the upper Y-branch and the second signal as the lower Y-branch have fundamental TE polarization. A spatial mode converter 310, e.g., a Y-coupler, converts the $TE_0$ mode of the first signal into the $TE_1$ mode without changing the second signal. A polarization converter 320 converts the $TE_1$ mode of the first signal into the $TM_0$ mode, without changing the second signal. In this embodiment, the polarization converter is a combination of two pads, i.e., a width taper 320, and a bi-level taper 330. In addition, a high-order mode filter 340 is removes the high-order modes, in particular the $TE_1$ mode. In the mode filter 340 the waveguide width is decreased linearly from, e.g., 2 um to 1.2 um over a length of 100 um. At the output of the device 500, the fundamental TE mode of the first component is converted to fundamental TM mode and the polarization of fundamental TE Mode of the second component is preserved. The fundamental modes TE and TM are combined and propagate concurrently.

Figure 6:
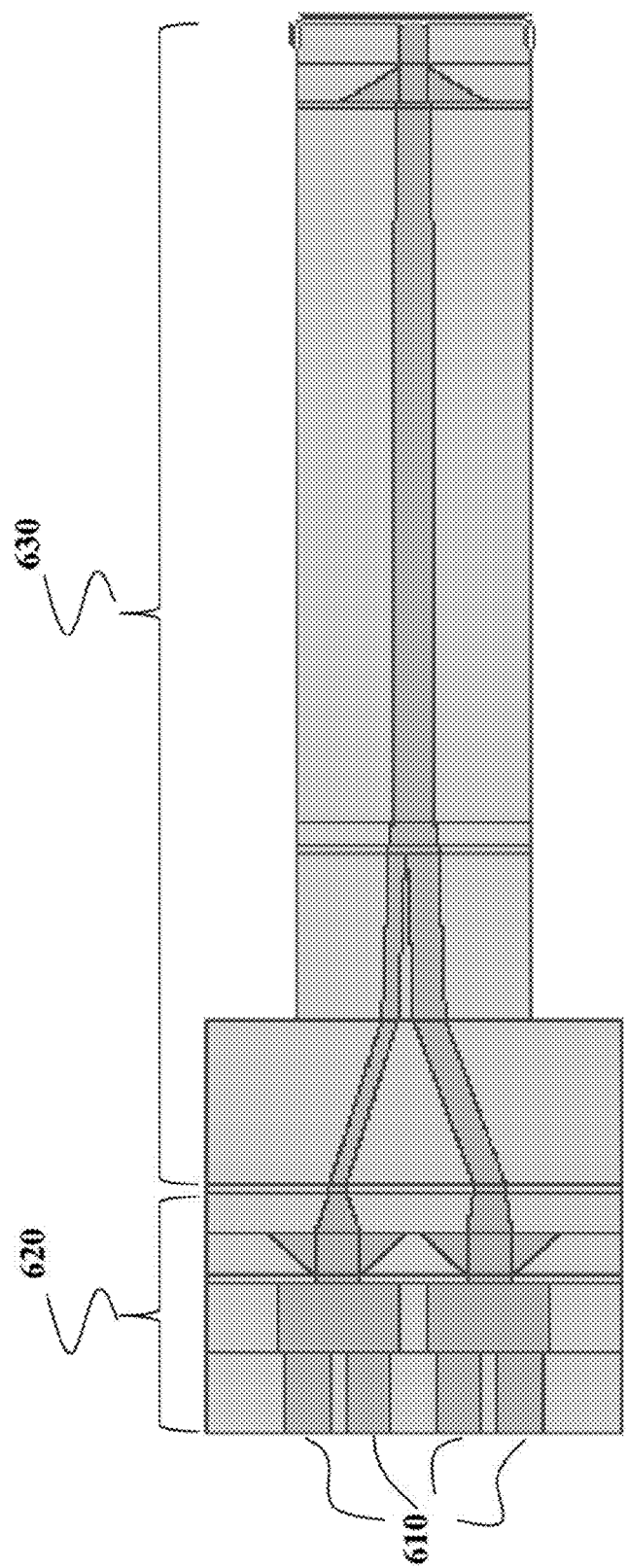
FIG. 6 is an example of a compound optical combiner according to some embodiments.

FIG. 6 shows an example of a compound optical combiner, comprising of four input ports 610, two power combiners 620, and a compound polarization converter/combiner 630.

Figure 7:
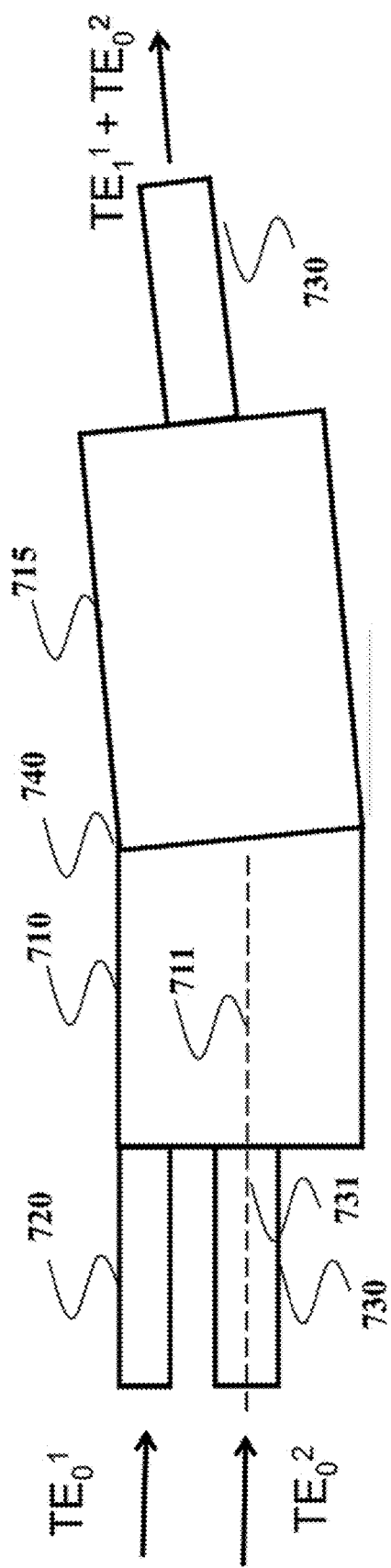
FIG. 7 is an example a spatial mode converter according to one embodiment of the invention.

FIG. 7 shows a spatial mode converter 700 according one embodiment of the invention. The spatial mode converter 700 can be combined with a polarization converter, e.g., the converter 320, to form the compound polarization combiner. The converter 700 is a multi-mode interference (MMI) device, with a tilted joint 740 between a first section 710 and a second section 715. The MMI-based converter 700 includes one output port 730 and two input ports. A first input port 720 is off-center, and a second input port 730 is at the center of a side of the section 710, i.e. an axis 731 of the second input pod is aligned with an axis 711 of the first section. A first signal in the $TE_0$ mode is an input to the first port 720. A second signal in the $TE_0$ mode is an input to the second port 730. The converter 700 converts the first signal from the $TE_0$ to the $TE_1$, while preserving the $TE_0$ mode the second signal.

FIGS. 8A and 8B show simulations of the propagation of the signals in a spatial mode converter 700. FIG. 8A the first signal entering the upper (off-center) port 720. FIG. 8B shows the second signal entering the lower center port. The tilted joint 740 is where the input signal to the upper port has a wide separation 742, while the input signal to the lower (center) port has a node 741. This way, the input signal to the upper port has an appropriate phase shift, and is converted to a second order TE mode 750, and the mode of the output signal 752 of the second input signal is preserved.

Figure 9A:
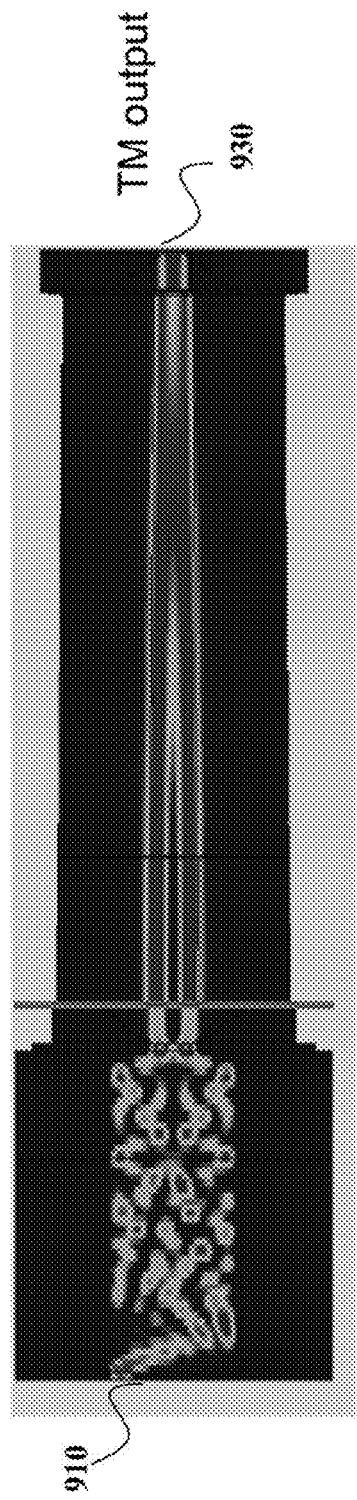
FIGS. 9A and 9B are illustration beam propagation of a compound optical combiner using the spatial mode converter of FIG. 7.
Figure 9B:
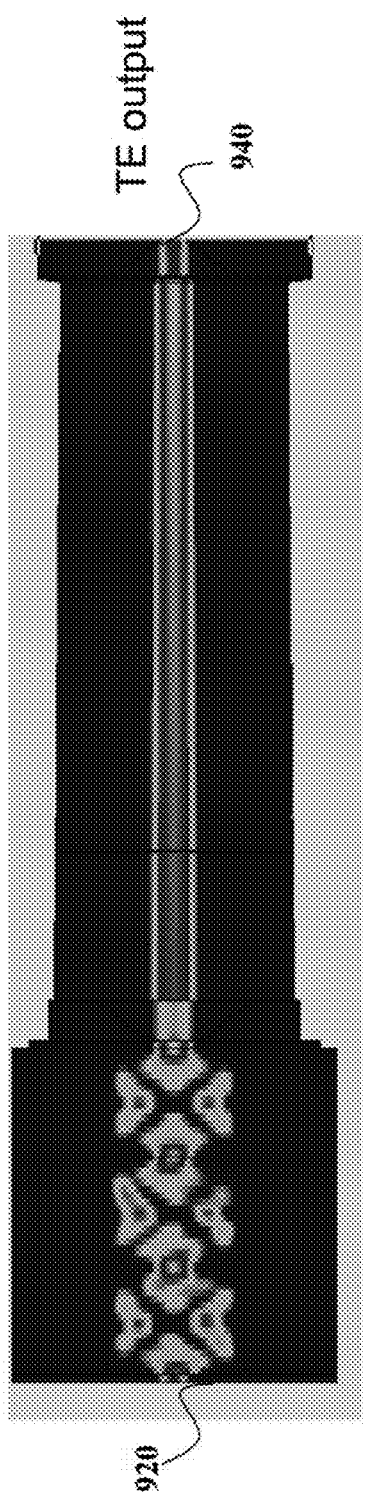

FIGS. 9A and 9B show the simulated beam propagation of a compound polarization converter/combiner using the spatial mode converter 700. FIG. 9A shows the conversion of the first input signal 910 in the TE mode propagating through the upper (off-center) port 720. FIG. 9B shows the conversion of the second input signal 920 in the TE mode propagating through the lower (center) port 730. The first signal is converted to the TM mode component 930 of the output signal, and the second signal forms the mode component of the output signal.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A compound optical combiner for combining multiple optical signals, comprising:
   a set of combiners, wherein the set of combiners includes at least one polarization combiner optically and physically connected to at least one non-polarization combiner, wherein the non-polarization combiner combines a first set of input signals while preserving a polarization of each input signal in the first set of signals, and wherein the polarization combiner combines a second set of input signals while converting the polarization of at least one input signal in the second set of signals, wherein the non-polarization combiner comprises:
   a first non-polarization combiner for combining a first input signal and a second input signals into a first combined signal; and
   a second non-polarization combiner for combining a third input signal and a fourth input signals into a second combined signal, and wherein the polarization combiner comprises:
   a polarization converter for converting the polarity of the second combined signal; and
   a combiner for combining the first input signal and the second combined signal to produce an output signal having a first component in a fundamental transverse magnetic (TM) mode and a second component in a fundamental transverse electric (TE) mode.

2. The compound optical combiner of claim 1, wherein the polarization combiner includes a polarization converter for converting a polarity of an optical signal and a combiner for combining multiple optical signals of different polarities.

3. The compound optical combiner of claim 1, wherein the set of combiners includes two non-polarization combiners connected to the polarization combiner, such that output signals of the two non-polarization combiners are input signals for the polarization combiner.

4. The compound optical combiner of claim 1, wherein the first input signal, the second input signal, the third input signal, and the fourth input signal are in the TE mode, the first non-polarization combiner and the second non-polarization combiner are power combiners, each of the first and the second combined signals includes two components in the TE mode, the polarization converter converts polarity of the two components of the second combined signals in the TM mode, such that the combiner combines two components in the TE mode of the first combined signals with two components in the TM mode of the second combined signal to produce the output signal having two components in the TE mode and two components in the TM mode.

5. The compound optical combiner of claim 1, wherein the first input signal is in the TE mode with a first wavelength $\lambda_1$, the second input signal is in the TE mode with a second wavelength $\lambda_2$, the third input signal is in the TE mode with a third wavelength $\lambda_3$, the fourth input signal is in the TE mode with a fourth wavelength $\lambda_4$, such that $\lambda_1 > \lambda_3 > \lambda_2 > \lambda_4$, and wherein the first and the second non-polarization combiner are wavelength combiners, and each of the first combined signal and the second combined signal includes two components in the TE mode, and the polarization converter converts the polarity of the two components of the second combined signals in the TM mode, such that the combiner combines two components in the TE mode of the first combined signals with two components in the TM mode of the second combined signal to produce the output signal having two components in the TE mode and two components in the TM mode.

6. The compound optical combiner of claim 1, wherein the polarization combiner includes a spatial mode converter and a polarization converter.

7. The compound optical combiner of claim 6, wherein an input to the polarization combiner includes include a first optical signal in a fundamental transverse electric ($TE_0$) mode, and a second optical signal in the $TE_0$ mode, wherein the spatial mode converter converts the $TE_0$ mode of the first optical signal into a first order transverse electric ($TE_1$) mode without changing the second optical signal, and wherein the polarization converter converts the mode of the first signal from the $TE_1$ mode into a fundamental transverse magnetic ($TM_0$) mode.

8. The compound optical combiner of claim 6, wherein the polarization converter includes a taper having an input side wider than an output side.

9. The compound optical combiner of claim 6, wherein the polarization converter includes a bi-level taper.

10. The compound optical combiner of claim 6, wherein the polarization converter includes a taper having an input side wider than an output side, and a bi-level taper.

11. The compound optical combiner of claim 6, wherein the spatial mode converter includes an asymmetric Y-shaped coupler.

12. The compound optical combiner of claim 6, wherein the spatial mode converter includes an asymmetric directional coupler.

13. The compound optical combiner of claim 6, wherein the spatial mode converter comprises:
    a multi-mode interference (MMI) structure including a first section connected to a second section by a tilted junction;
    at least two input ports including a first port arranged off-center of the MMI structure and a second port arranged at a center of the MMI structure, such that a first signal propagated through the first port has a wide separation at the tilted junction, and a second signal propagate through the second port has a node at the tilted junction; and
    at least one output port.

14. A compound optical combiner for combining multiple optical signals, comprising:
    a set of combiners, wherein the set of combiners includes at least one polarization combiner optically connected to at least one non-polarization combiner, wherein the non-polarization combiner combines a first set of input signals while preserving a polarization of each input signal in the first set of signals, and wherein the polarization combiner combines a second set of input signals while converting the polarization of at least one input signal in the second set of signals, wherein the polarization combiner includes a spatial mode converter and a polarization converter, and wherein an input to the polarization combiner includes include a first optical signal in a fundamental transverse electric ($TE_0$) mode, and a second optical signal in the $TE_0$ mode, wherein the spatial mode converter converts the $TE_0$ mode of the first optical signal into a first order transverse electric ($TE_1$) mode without changing the second optical signal, and wherein the polarization converter converts the mode of the first signal from the $TE_1$ mode into a fundamental transverse magnetic ($TM_0$) mode.

15. A compound optical combiner for combining multiple optical signals, comprising:
- a set of combiners, wherein the set of combiners includes at least one polarization combiner optically connected to at least one non-polarization combiner, wherein the non-polarization combiner combines a first set of input signals while preserving a polarization of each input signal in the first set of signals, and wherein the polarization combiner combines a second set of input signals while converting the polarization of at least one input signal in the second set of signals, wherein the polarization combiner includes a spatial mode converter and a polarization converter, and wherein the spatial mode converter comprises:
- a multi-mode interference (MMI) structure including a first section connected to a second section by a tilted junction;
- at least two input ports including a first port arranged off-center of the MMI structure and a second port arranged at a center of the MMI structure, such that a first signal propagated through the first port has a wide separation at the tilted junction, and a second signal propagate through the second port has a node at the tilted junction; and
- at least one output port.

* * * * *